United States Patent Office 3,189,530
Patented June 15, 1965

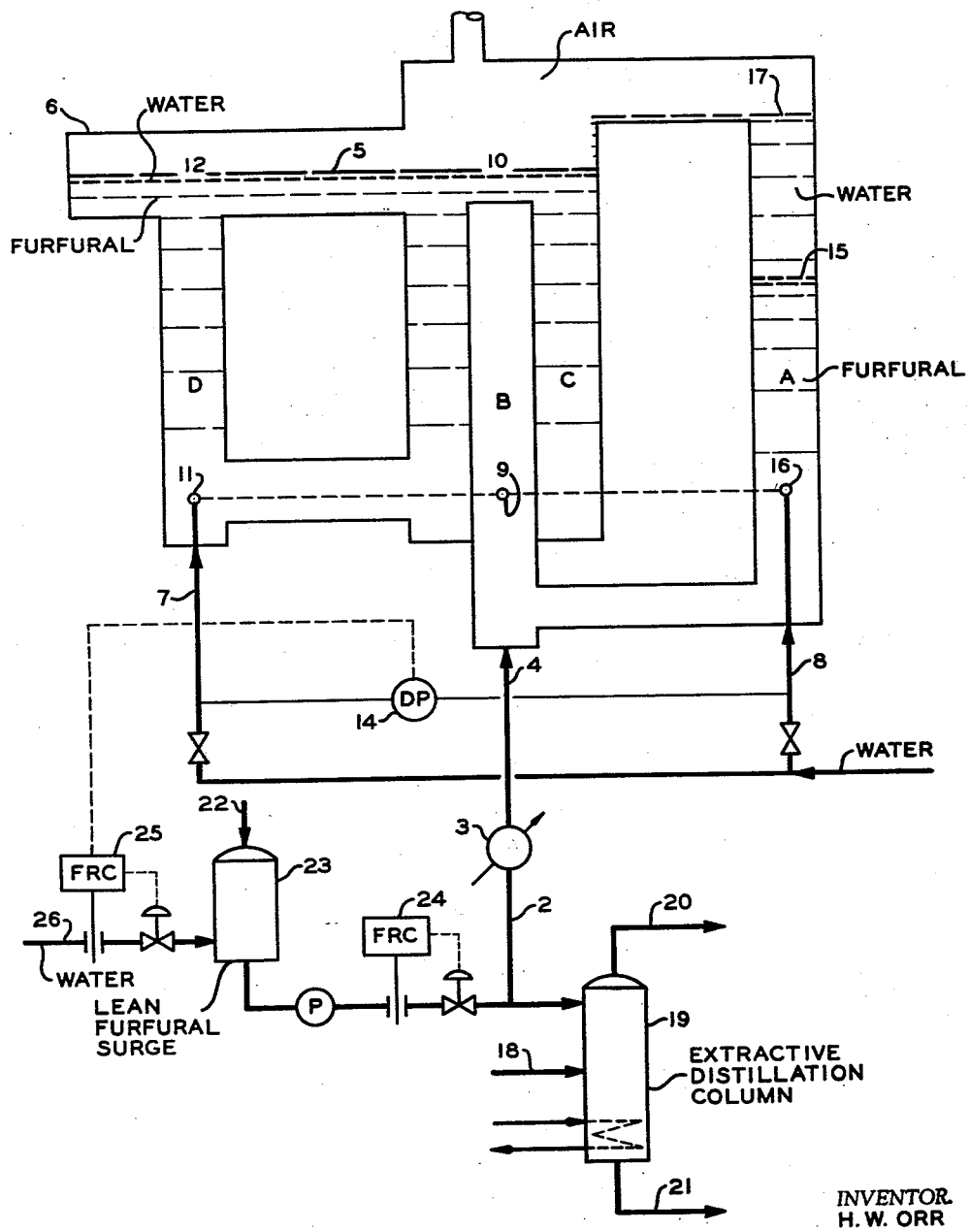

1

3,189,530
SOLVENT MONITOR
Harold W. Orr, Borger, Tex., assignor to Phillips Petroleum Company, a corporation of Delaware
Filed July 28, 1961, Ser. No. 127,699
3 Claims. (Cl. 202—39.5)

This invention relates to method and apparatus for measuring and indicating, recording or controlling the density or specific gravity of a liquid or liquid mixture. More specifically, this invention relates to a method and apparatus for the monitoring of a solvent system in a process for the production of butadiene. In one aspect this invention relates to a method for controlling the amount of one component in a multi component system by separating the system into two phases and determining the pressure differential between same. Another aspect of this invention relates to method of controlling the water addition to a furfural solvent system by providing an apparatus for obtaining a pressure differential signal. In another aspect, this invention relates to a method for determining the amount of water in a solvent system by separating the system into its phases and producing a signal representative of the concentration of one member of the system.

A commercial process used in the production of 1,3-butadiene includes the following steps: (1) butane dehydrogenation into butenes, (2) butene recovery or purification, (3) butene dehydrogenation to butadiene, and (4) butadiene recovery or purification. In such a process, it is conventional to pass the effluent from the step (1) dehydrogenation into a depropanizer system for the removal of $C_3$'s and lighter boiling components. The depropanized liquid is passed into a deoiler where $C_5$'s and higher boiling hydrocarbons are removed as a kettle product. The overhead product from the deoiler is passed into a butene-1 column where butene-1, butane and butadiene are removed as an overhead product and passed into a butane removal column where butadiene and butene-1 are removed as an overhead product. The kettle product of the butene-1 column which contains butene-2 and some butane plus the kettle product of the butane removal column which contains some butene-2 and butane are passed into a step 2 extractive distillation column where furfural is used as a solvent. The overhead, of the furfural extractive distillation column, which contains mostly butane, is recycled as part of the feed to the step 1 butane dehydrogenation system. The rich furfural from the furfural extractive distillation column is passed into a furfural stripper wherein butene-1 and butene-2 are removed and recycled to step 3 butene dehydrogenation process. The overhead product from the butane removal column which is composed of butane, butene-1 and butadiene is passed to the step 4 furfural extractive distillation column.

The effluent from the step 3 butylene dehydrogenation system is depropanized and the depropanized hydrocarbons are passed into a butene-2 column wherein butene-2 and higher boiling hydrocarbons are removed as a kettle product and passed to step 4 deoiler. The $C_5$'s and heavier hydrocarbons are removed from the deoiler for further handling and the overhead product from the deoiler, which is composed mostly of butylenes is recycled to step 3 dehydrogenation system. The overhead from the

2 butene-2 column which is composed mostly of butene-1, butene-2 and butadiene, is passed into step 4 extractive distillation column where furfural is used as a solvent. The unabsorbed hydrocarbons from the extractive column, which is composed mostly of butene-1 is recycled to the step 3 dehydrogenation system. The rich furfural from the extractive distillation column is stripped to obtain an overhead product of butene-2 and butadiene which is passed into a fractionation column where butadiene is produced as an overhead product and butene-2 and heavier hydrocarbons are produced as a kettle product. The kettle product from the butadiene fractionation column may be passed into the step 4 deoiler where butene-2 is removed as an overhead product and recycled into step 3 dehydrogenation system.

In carrying out this process the solvent generally employed in the step (4) extractive distillation column is furfural. However, in actual operation of the butadiene recovery process it has now been recognized that a method of monitoring both the water and oil content in furfural is needed.

In recovering butadiene it is desirable to use an organic solvent which has a preference for the compound to be recovered and which is most unsaturated. Such a selective solvent is furfural. However, furfural alone did not give optimum selective extraction. To overcome this difficulty water was added to the solvent with the result that the selectivity of the solvent was greatly improved. By utilizing the water-furfural medium for extractive distillation, it was found that such a system has to be monitored so as to provide optimum conditions for the selective extraction.

I have now discovered that the water in lean furfural may be determined by measuring the density of the furfural after it has been cooled until water separates from the furfural and then balancing the density of the combined two-phase water furfural system against the density of saturated furfural at the same temperature as the said two-phase system. The difference in density measured is then used to control the rate of addition of water to the lean furfural.

Thus, it is an object of this invention to provide method and apparatus for monitoring an absorption system. Another object of this invention is to provide a method and apparatus for monitoring the solvent in an extractive distillation system. A further object of this invention is to measure the changes in the water content of furfural after the hydrocarbons have been stripped therefrom. Another object is to provide method and apparatus to control the rate of water added to lean furfural. A still further object is to provide means to separate water from lean furfural that has been cooled until a water phase and a furfural phase are formed at a controlled temperature. Another object is to provide an instrument for monitoring an extractive distillation in a butadiene system.

When furfural is used as a solvent in an extractive distillation system, the most unsaturated hydrocarbons are absorbed and the most saturated hydrocarbons pass out of the system. That is, butenes are preferentially absorbed in the presence of butane and butadiene is preferentially absorbed in the presence of butylenes. During the extractive distillation and the stripping of the rich furfural that has absorbed hydrocarbons, some of the water present in the solvent is removed as an overhead product. It is necessary to continuously add water to the lean furfural before it passes into the extractive distillation column.

Other aspects, objects and the several advantages of this invention will be apparent from a study of this disclosure, the appended claims and the drawings of which:

The figure is a diagrammatic view of the method and apparatus of this invention.

In accordance with this invention as illustrated by the figure lean furfural is passed through line 2, heat exchanger 3, line 4 and into column B of the analyzer. The furfural is cooled to about 81° F. in heat exchanger 3. However, there is no critical temperature as long as the furfural is cooled to a constant temperature and as long as the temperature is low enough that a water phase and a furfural phase are formed. As the furfural rises in column B, the globules of water separate and form an upper layer 5 of water. The furfural and water flow out of the system through conduit 6. Furfural saturated with water passes down through column C which surrounds column B and passes into column D. Some furfural passes from column B to column A. The furfural which passes into column A will be at least saturated with water but will contain a lower concentration of water than the furfural that is passing through line 4. Water is passed through lines 7 and 8 into columns D and A, respectively, at a rate of about 20 drops per minute. The water that passes through line 8 flows against a pressure equivalent to a column of the fluid passing through line 4 that is equal in height from point 9 to point 10. The pressure exerted against the flow of water through line 7 is equal to a column of furfural saturated with water, from point 11 to point 12. The difference in pressure measured by DP cell 14 is in relationship to the difference in the density of the fluid flowing through line 4 and that of furfural saturated with water. The interface 15 between furfural and water in column A may change, but the pressure exerted by a column of fluid from point 16 to point 17 will always be the same as the pressure exerted by the column of fluid in column B from point 9 to point 10.

Hydrocarbons are passed through line 18 into furfural extractive distillation column 19. Unabsorbed hydrocarbons pass overhead from absorber 19 through line 20. Rich furfural passes from absorber 19 through line 21. Lean furfural passes through line 22 into surge 23. Furfural flows from surge 23 through line 24 and into absorber 19. A small side stream of the furfural passing through line 24 is passed through line 2. RFC 25 regulates the rate of flow of water through line 26 into lean furfural surge tank 23. DP cell 14 resets RFC 25. The proportion of the amount of reset by DP cell 14 onto RFC 25 to that of the differential pressure measured by DP cell 14 is changed intermittently by hand after the water concentration of the furfural passing through line 2 is measured.

EXAMPLE

Furfural containing 12 percent oil and 6.2 percent water by weight is supersaturated by cooling and passed through line 4 into column B. Addition of the furfural is continued and as it rises through the column the globules of water separate and form an upper layer. Resulting furfural saturated with water passes down through column C and passes into column D. The furfural in column D contains 4 percent water and 12.3 percent oil by weight. Some furfural passes from column B to column A. Water is passed through lines 7 and 8 into columns D and A at a rate of about 20 drops per minute. The difference in pressure measured by DP cell is 0.210 inch of water. The temperature in the testing device was 82° F. Under normal conditions, the percent by weight in the furfural passing through line 2 was 6.2±.2 percent.

As the concentration of water in the system changes it will be necessary to determine the concentration of water in line 2 and calibrate the equipment since the oil content effects the solubility of water in furfural, as shown by the following table.

Table I.—Effect of oil concentration on solubility of water in furfural

| Wt. Percent Oil | Wt. Percent Water in Column C (@ 45° F.) |
| --- | --- |
| 4.5 to 5.0 | 2.7 |
| 5.0 to 5.75 | 2.6 |
| 5.75 to 6.75 | 2.5 |
| 6.75 to 8.0 | 2.4 |
| 8.0 to 10.0 | 2.3 |
| 10.0 to 13.0 | 2.2 |
| Above 13.0 | 2.1 |

By maintaining the temperature constant, all water in excess of a known soluble amount is separated and decanted. This excess amount of water is indicated by a difference in density in the two measuring chambers and is recorded as an addition to the known soluble amount of water at a given temperature.

The oil content of the furfural being analyzed is indicated and recorded by the density of the furfural after it has been standardized as to water content. A change in oil content will introduce a small error in the water analysis. This small error may be calculated and corrected if desired.

While it is preferred to utilize water bubbles on legs A and D other fluid expedients such as gas or air may also be used. However, a more stable system is achieved when water is employed.

Reasonable variation and modification are possible within the scope of the foregoing disclosure, the essence of which is that there is provided method and apparatus for monitoring oil and water in a liquid which comprises (1) cooling the liquid until two phases are formed, (2) measuring the gravity of the two phase liquid mixture, (3) separating the excess water from the saturated solution, (4) determining the difference in gravity of the saturated solution and the two phase liquid mixture and thereafter utilizing such measurements to control water fed into the liquid.

I claim:

1. A method for determining the concentration of water in a furfural-water solution which comprises
   obtaining a portion of said furfural-water solution,
   cooling said portion to a predetermined temperature, at which predetermined temperature said portion becomes supersaturated with water whereby some of said water forms a dispersion of water phase in a furfural phase saturated with water, and at which predetermined temperature the amount of water in said furfural phase saturated with water is known,
   introducing the resulting dispersion of said water phase in said furfural phase saturated with water into a separation zone wherein said water phase is separated and removed from said furfural phase saturated with water and a body of said furfural phase saturated with water is formed, and
   measuring the difference in hydrostatic pressure between said body of said furfural phase saturated with water and a body of said resulting dispersion of said water phase in said furfural phase saturated with water immediately prior to the introduction of said resulting dispersion into said separation zone, said bodies being of equal height, thereby obtaining a value representative of the concentration of said dispersed water in said furfural phase saturated with water.

2. Apparatus for monitoring a liquid system having at least two different liquids therein which comprises
- a first vertically elongated column,
- a second vertically elongated column disposed in said first column and extending substantially the length of said first column and forming an annular area therein,
- a third vertically elongated column substantially the length of said first column so adapted as to have the lower portion thereof in unobstructed communication with said first vertically elongated column,
- a fourth vertically elongated column so adapted as to have the lower portion thereof in communication with said second vertically elongated column at a point below the annular area formed by said first and second columns and extending to a height above said first, second and third columns,
- decantation means provided in an upper area of said vertically elongated columns which are in open and unobstructed communication with each other and adapted to receive overflow from said first, second, third and fourth columns so as to allow the removal of liquid from the upper end of said columns,
- means communicating with the lower end of said second column to introduce a first fluid therein which is a portion of the system to be monitored,
- means communicating with said third and fourth columns to allow introduction of a second fluid therein at the same horizontal level,
- measuring means connected to said means for introduction of said second fluid adapted to determine the pressure differential of the liquid in said third and fourth columns, each of said columns being of a length sufficient to form a column of fluid sufficient to allow overflow therefrom, and
- means responsive to said measuring means to regulate the relative proportions of the liquids in the system.

3. In a process for separating by extractive distillation less saturated hydrocarbons from more saturated hydrocarbons utilizing a lean solvent-water solution extractant, the improvement which comprises controlling the rate of addition of water to substantially water-free lean solvent to form said lean solvent-water solution by (1) cooling a portion of said lean solvent-water solution to a predetermined temperature immediately prior to introducing said solvent-water solution into an extractive distillation zone, at which predetermined temperature said portion becomes supersaturated with water whereby some of said water forms a dispersion of water phase in lean solvent saturated with water, and at which predetermined temperature the amount of water in said lean solvent saturated with water is known; (2) introducing the resulting dispersion of water phase in lean solvent saturated with water into a separation zone wherein said dispersed water phase is separated and removed from said lean solvent saturated with water and a body of said lean solvent saturated with water is formed; (3) measuring the difference in hydrostatic pressure between said body of said lean solvent saturated with water and a body of said resulting dispersion of said water phase in said lean solvent phase saturated with water immediately prior to the introduction of said resulting dispersion into said separation zone, said bodies being of equal height; (4) obtaining a signal representative of the concentration of said dispersed water phase in said lean solvent saturated with water responsive to said measurement; and (5) utilizing said signal to control the rate of water added to said substantially water-free solvent.

No references cited.

NORMAN YUDKOFF, *Primary Examiner.*

GEORGE D. MITCHELL, ALPHONSO D. SULLIVAN,
*Examiners.*